United States Patent
Thakur et al.

(10) Patent No.: US 12,516,418 B2
(45) Date of Patent: Jan. 6, 2026

(54) CR(III) BASED DRY-IN-PLACE COATING COMPOSITION FOR ZINC COATED STEEL

(71) Applicant: Henkel AG & Co. KGaA, Duesseldorf (DE)

(72) Inventors: Priya Thakur, Karvenagar (IN); Meenu Vijay, Pune (IN); Niranjan Das, Maharashtra (IN)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 18/362,062

(22) Filed: Jul. 31, 2023

(65) Prior Publication Data

US 2023/0374665 A1 Nov. 23, 2023

Related U.S. Application Data

(63) Continuation of application No. PCT/EP2022/050910, filed on Jan. 17, 2022.

(30) Foreign Application Priority Data

Feb. 1, 2021 (GB) .................... 2101371

(51) Int. Cl.
*C23C 22/34* (2006.01)

(52) U.S. Cl.
CPC .......... *C23C 22/34* (2013.01); *C23C 2222/10* (2013.01)

(58) Field of Classification Search
CPC ................................. C23C 22/34
See application file for complete search history.

(56) References Cited

U.S. PATENT DOCUMENTS

| | | | |
|---|---|---|---|
| 2,559,878 A | 7/1951 | Johnson | |
| 3,501,352 A | 3/1970 | Shah | |
| 3,647,569 A | 3/1972 | Schneider | |
| 3,932,198 A | 1/1976 | Schneider | |
| 4,349,392 A | 9/1982 | Huvar | |
| 4,359,345 A | 11/1982 | Da Fonte, Jr. | |
| 4,359,346 A | 11/1982 | Da Fonte, Jr. | |
| 4,359,347 A | 11/1982 | Da Fonte, Jr. | |
| 4,359,348 A | 11/1982 | Crotty | |
| 4,367,099 A | 1/1983 | Lash et al. | |
| 4,578,122 A | 3/1986 | Crotty | |
| 4,944,812 A | 7/1990 | Lindert et al. | |
| 5,507,884 A | 4/1996 | Ogino et al. | |
| 5,743,971 A | 4/1998 | Inoue et al. | |
| 5,855,695 A | 1/1999 | McMillen et al. | |
| 9,676,895 B2 | 6/2017 | Harkal et al. | |
| 9,783,892 B2 | 10/2017 | Schlosser et al. | |
| 2009/0266450 A1* | 10/2009 | McCormick | C23F 11/141 148/400 |
| 2010/0180793 A1* | 7/2010 | Dingwerth | C23C 22/83 106/14.41 |
| 2011/0070429 A1* | 3/2011 | Rochester | C09D 5/084 427/372.2 |
| 2013/0266819 A1 | 10/2013 | Vonk et al. | |
| 2014/0360630 A1 | 12/2014 | Arnold et al. | |

FOREIGN PATENT DOCUMENTS

| | | |
|---|---|---|
| CN | 112135926 A | 12/2020 |
| DE | 19733972 A1 | 2/1999 |
| DE | 102007021364 A1 | 11/2008 |
| DE | 102010001686 A1 | 8/2011 |
| EP | 1571238 A1 | 9/2005 |
| EP | 2014793 A2 | 1/2009 |
| EP | 2281923 A1 | 2/2011 |
| EP | 2319957 B1 | 1/2017 |
| GB | 1461244 A | 1/1977 |
| WO | 2010060883 A1 | 6/2010 |

OTHER PUBLICATIONS

International Search Report for PCT/EP2022/050910 mailed May 12, 2022, 2 pages.

* cited by examiner

*Primary Examiner* — Robert A Vetere
(74) *Attorney, Agent, or Firm* — Mary K. Cameron

(57) ABSTRACT

An aqueous passivation composition for treatment of zinc or zinc alloy coatings is provided that is substantially free of nitrate anions and hexavalent chromium, said composition having a pH of less than 3 and comprising: i) a source of trivalent chromium (Cr(III)) ions; ii) at least one α-hydroxy-carboxylic acid represented by the General Formula (I): $R^1CH(OH)COOH$ (I), where $R^1$ represents a hydrogen atom, a $C_1$-$C_4$ alkyl group, a $C_2$-$C_6$ alkenyl group, a $C_1$-$C_6$ alkoxy group, a $C_3$-$C_6$ cycloalkyl group or a $C_6$-$C_{10}$ aryl group; iii) phosphoric acid; iv) at least one compound having both a thiol group (—SH) and a carboxyl group (—$CO_2H$); and v) at least one water-soluble or water-dispersible fluoroacid or a salt of Ti, Zr, Hf, Si, Sn, Al, Ge, and B.

14 Claims, No Drawings

CR(III) BASED DRY-IN-PLACE COATING COMPOSITION FOR ZINC COATED STEEL

FIELD OF THE INVENTION

The present invention is directed to aqueous acidic passivation compositions comprising at least one thiol functional carboxylic acid. More particularly, the invention is directed to aqueous acidic passivation compositions that are characterized by comprising a trivalent chromium compound, at least one α-hydroxycarboxylic acid and at least one thiol functional carboxylic acid.

BACKGROUND OF THE INVENTION

The coating or plating of base metal substrates with a metal, such as zinc, in order to provide both a decorative finish and/or corrosion protection to that base metal substrate, is long established in the art. The standards of quality control for coated and plated substrates can, of course, be demanding and consumers will therefore closely scrutinize the finish and appearance of the treated surface. Having regard to protective coatings based on zinc and zinc alloys, a surface condition known as "wet storage stain" can be unsightly and can impair the further painting or coating of the substrate. This stain, which is also known as "white rust" or "black rust" (for Galvalume® coatings) is attributable to the formation of zinc oxide and zinc hydroxide and develops upon exposure of the deposited zinc or zinc alloy to atmospheric oxygen and moisture.

Techniques to obviate wet storage stain on newly galvanized substrates are known and include inter alia: the application of duplex or powder coatings; the application of waxes and oil, particularly for base metal substrates in the forms of sheets, beams and wires; and, passivation treatments. The present invention is concerned with the treatment of zinc coatings or platings with passivation compositions which, in addition to providing corrosion resistance, can provide a variety of color coatings—including blue, yellow, olive or black—and an effective base for subsequent dyeing and coating operations.

Prior art passivation compositions have predominantly been based upon acidic aqueous solutions of chromate salts. Upon applying an acidic chromate passivation solution to a zinc coated or plated substrate, surface zinc atoms are oxidized to form, in effect, an interfacial layer of hydrated basic chromium chromate ($Cr_2O_3CrO_3 \cdot xH_2O$) and hydrous oxides of both chromium and zinc. As the acid is consumed in the oxidation reaction, however, the pH at the surface-liquid interface increases: this diminishes the combining power of chromium in the aqueous phase and leads to the precipitation of a thin gelatinous film comprising chromium hydroxide and complexes of chromium ions and zinc. This film builds up until acid protons can no longer contact the zinc metal and the surface redox reactions are thereby stopped: the resulting gel-like film may then be permitted to harden.

Traditionally, hexavalent chromium ($Cr^{6+}$ or chromium (VI)) was used in passivation compositions to supply the chromium present in the passivation film or conversion coating. However, the toxicological properties of chromium (VI) are problematic and the use of chromium(VI)—containing passivation treatments has also been strongly limited by inter alia EC directive 2000/53/ EC. Consequently, there has been some focus in the art on the treatment of zinc surfaces with passivation compositions in which the chromium is at least partly in the trivalent state: mention in this regard may be made of the timeworn disclosures of: U.S. Pat. Nos. 2,559,878; 3,932,198; 3,647,569; 3,501,352; 4,359,345; 4,359,346; 4,359,347; 4,359,348; 4,349,392; 4,367,099; German Patent No. DE 2526832; and, UK Patent No. GB 1,461,244. The Cr(III), as used in these citations, is not toxic and the concomitant waste removal of Cr(III) is not as expensive as that of hexavalent chromium.

Chromium (III) passivate compositions as described in the aforementioned patents nearly invariably employ peroxide-type oxidizing agents, such as $H_2O_2$, as necessary bath constituents. These and like oxidizing agents, such as persulphates, can promote some conversion of trivalent chromium to hexavalent chromium during the formation of the conversion coating. A further problem associated therewith is the high rate of consumption and loss of the peroxide or persulphate oxidizing agent which necessitates their frequent replenishment and moreover a careful control of the pH of the composition to obviate concomitant rise in pH. The consumption of peroxide (and persulphate) compounds is due in part to the presence of various activating metal ions—present in the solution as additives or contaminants—which tend to catalyze decomposition of the oxidizing agent. The frequent replenishment of the peroxide and persulphate compounds represents an economic and energetic cost to the performance of the passivation or conversion process.

Certainly, passivation compositions based on chromate (III) which do not employ peroxide or persulphate-type oxidizing agents are known in the art. For example, U.S. Pat. No. 4,578,122 A (Crotty) describes an aqueous acidic peroxide-free solution which is utilized in a process for treating receptive metal surfaces to impart a chromium passivate film thereon. The described aqueous solution contains: chromium ions, substantially all of which are present in the trivalent state; hydrogen ions to provide a pH of about 1.2 to about 2.5; at least one additional metal ion selected from the group consisting of iron, cobalt, nickel, molybdenum, manganese, lanthanum, cerium and lanthanide, said ion(s) being present in an amount effective to activate the formation of the chromate passivate film; and, nitrate ions as the essential oxidizing agent, said nitrate ions being present in an amount to provide a molar ratio of nitrate ions to the sum of chromium ions and activating metal ions of at least 4:1. The amount of nitrate ions should further be sufficient to activate the hydrated trivalent chromium to form a chromate film on the substrate. The aqueous acidic solution can optionally further contain controlled amounts of: sulfate ions; halide ions; organic carboxylic acids; a bath soluble and compatible silicate compound; and, at least one wetting agent.

The presence of nitrate salts in the composition of U.S. Pat. No. 4,578,122 is considered highly disadvantageous. Such salts are converted to $NO_x$ during the spontaneous decomposition or the intended oxidation activity, and this $NO_x$ diffuses into the atmosphere as a pollutant.

There consequently remains a need in the art to develop aqueous acidic passivation compositions which have particular applicability to steel surfaces coated with zinc or zinc alloys and in which the levels of compounds such as chromate (VI), peroxides, persulphates and nitrate salts can be minimized but wherein the reduction of such compounds in such developed compositions is not compensated by a decline in the performance of the compositions.

SUMMARY OF THE INVENTION

In accordance with a first aspect of the invention, there is provided an aqueous passivation composition for the treatment of zinc or zinc alloy coatings, said composition having a pH of less than 3 and comprising:
i) a source of trivalent chromium (Cr(III)) ions;
ii) at least one α-hydroxycarboxylic acid represented by the General Formula (I):

$$R^1CH(OH)COOH \qquad (I)$$

wherein: $R^1$ represents a hydrogen atom, a $C_1$-$C_4$ alkyl group, a $C_2$-$C_6$ alkenyl group, a $C_1$-$C_6$ alkoxy group, a $C_3$-$C_6$ cycloalkyl group or a $C_6$-$C_{10}$ aryl group;
iii) phosphoric acid;
iv) at least one compound having both a thiol group (—SH) and a carboxyl group (—CO$_2$H); and,
v) at least one water-soluble or water-dispersible fluoroacid or a salt thereof, wherein said fluoroacid is defined by the General Formula (II):

$$H_pT_qF_rO_s \qquad (II)$$

wherein: each of q and r represents an integer from 1 to 10;
each of p and s represents an integer from 0 to 10; and,
T represents an element selected from the group consisting of Ti, Zr, Hf, Si, Sn, Al, Ge, and B;
wherein said composition is characterized in that it is substantially free of nitrate anions and is substantially free of hexavalent chromium (Cr(VI)). The passivation is preferably further characterized as being substantially free of peroxide and persulfate compounds.

There is, for example, provided an aqueous passivation composition for the treatment of zinc or zinc alloy coatings, said composition having a pH of less than 3, for example from 1 to 2.5 or from 1 to 2, and said composition comprising:
i) from 0.05 to 0.50 moles/liter, preferably from 0.05 to 0.40 moles/liter of chromium (Cr(III)) ions;
ii) at least one α-hydroxycarboxylic acid represented by the General Formula (I):

$$R^1CH(OH)COOH \qquad (I)$$

wherein: $R^1$ represents a hydrogen atom, a $C_1$-$C_4$ alkyl group, a $C_2$-$C_6$ alkenyl group, a $C_1$-$C_6$ alkoxy group, a $C_3$-$C_6$ cycloalkyl group or a $C_6$-$C_{10}$ aryl group; and,
further wherein the molar ratio of carboxylic acid groups of said at least one α-hydroxycarboxylic acid to chromium (Cr) does not exceed 1.5:1, preferably does not exceed 1.3:1, but preferably is at least 0.5:1;
iii) phosphoric acid;
iv) from 1 to 10 wt. %, preferably from 1 to 8 wt. %, based on the weight of the composition at least one compound having both a thiol group (—SH) and a carboxyl group (—CO$_2$H);
v) at least one water-soluble or water-dispersible fluoroacid or a salt thereof, wherein said fluoroacid is defined by the General Formula (II):

$$H_pT_qF_rO_s \qquad (II)$$

wherein: each of q and r represents an integer from 1 to 10;
each of p and s represents an integer from 0 to 10; and,
T represents an element selected from the group consisting of Ti, Zr, Hf, Si, Sn, Al, Ge, and B; and,
further wherein said at least one water-soluble or water-dispersible fluoroacid or a salt thereof is included in the composition in an amount such that the molar ratio of total mineral acid to the metal (T) of said fluoroacid is in the range from 10:1 to 1:1, preferably from 6:1 to 1:1 and more preferably 4:1 to 1:1; and,
from 30 to 80 wt. %, preferably from 40 to 80 wt. %, based on the weight of the composition, of water;
wherein said composition is characterized in that it is substantially free of nitrate anions and hexavalent chromium (Cr(VI)) and is further substantially free of peroxide and persulphate compounds. For completeness, phosphoric acid is a mineral acid but further mineral acids can be present in the composition as optional adjunct ingredients: the sum of phosphoric acid and said adjunct acids, if present, is included with the term "total mineral acid".

The aforementioned source of trivalent chromium ions may be constituted by a salt selected from the group consisting of: chromium sulfate (Cr$_2$(SO$_4$)$_3$); chromium alum (KCr(SO$_4$)$_2$); chromium chloride (CrCl$_3$); and, chromium bromide (CrBr$_3$). Alternatively or additionally, the source of trivalent chromium ions may comprise a source of hexavalent chromium ions (Cr(VI)): the composition will then comprise at least one reducing agent in an amount sufficient to ensure complete reduction of the hexavalent chromium to trivalent chromium. The source of hexavalent chromium ions (Cr(VI)) may in certain embodiment be selected from the group consisting of: chromium trioxide (CrO$_3$); lithium chromate (Li$_2$CrO$_4$); lithium dichromate (Li$_2$Cr$_2$O$_7$); sodium chromate (Na$_2$CrO$_4$); sodium dichromate (Na$_2$Cr$_2$O$_7$); potassium chromate (K$_2$CrO$_4$); potassium dichromate (K$_2$Cr$_2$O$_7$); ammonium chromate ((NH$_4$)$_2$CrO$_4$) ammonium dichromate ((NH$_4$)$_2$Cr$_2$O$_7$); magnesium chromate (MgCrO$_4$); magnesium dichromate (MgCr$_2$O$_7$); calcium chromate (CaCrO$_4$); calcium dichromate (CaCr$_2$O$_7$); zinc chromate (ZnCrO$_4$); and, zinc dichromate (ZnCr$_2$O$_7$).

It is preferred that ii) said at least one α-hydroxycarboxylic acid is selected from the group consisting of: glycolic acid; lactic acid; 2-hydroxybutanoic acid; 2-hydroxypentanoic acid; and, 2-hydroxyhexanoic acid. Independently, it is preferred that iv) said at least one compound having both a thiol group (—SH) and a carboxyl group (—CO$_2$H) is selected from the group consisting of: thiomalic acid, thioglycolic acid, thiocoumaric acid, cysteine; and, thiolactic acid.

In an embodiment said at least one water-soluble or water-dispersible fluoroacid v) is defined by the General Formula (IIA):

$$H_pT_qF_rO_s \qquad (IIA)$$

wherein: T is selected from Ti, Zr, or Si;
is 1 or 2;
q is 1;
r is 2, 3, 4, 5 or 6; and,
s is 0, 1, or 2.

In particular, said at least one water-soluble or water dispersible fluoroacid may be selected from the group consisting of: fluorotitanic acid (H$_2$TiF$_6$); fluorozirconic acid (H$_2$ZrF$_6$); fluorosilicic acid (H$_2$SiF$_6$); fluoroboric acid (HBF$_4$); fluorostannic acid (H$_2$SnF$_6$); fluorogermanic acid (H$_2$GeF$_6$); fluorohafnic acid (H$_2$HfF$_6$); and, fluoroaluminic acid (H$_3$AlF$_6$).

In an important embodiment, the composition as defined herein above and in the appended claims, is obtainable through: mixing a portion comprising hexavalent chromium dissolved in water with a molar excess of α-hydroxycarboxylic acids according to component ii), in which step the molar ratio of carboxylic acid groups to chromium is preferably in the range from 1.1:1 to 2.5:1; and thereafter; adding the components iii) to v) to said mixture.

In accordance with a second aspect of the invention, there is provided a process for imparting a chromate passivate film to a substrate to which a zinc or zinc alloy coating has been applied to at least one surface thereof, said process comprising contacting said at least one coated surface of the substrate with an aqueous composition as defined herein above and in the appended claims at a temperature ranging from 20° C. to 90° C. for a period of time sufficient to form a passivate film thereon.

In accordance with a third aspect of the invention, there is provided a passivated substrate obtained by the process defined herein above and in the appended claims. The passivated substrate has been demonstrated to provide efficacious resistance to corrosion.

Definitions

As used herein, the singular forms "a", "an" and "the" include plural referents unless the context clearly dictates otherwise.

The terms "comprising," "comprises" and "comprised of" as used herein are synonymous with "including," "includes," "containing" or "contains," and are inclusive or open-ended and do not exclude additional, non-recited members, elements or method steps. If used, the phrase "consisting of" is closed, and excludes all additional elements. Further, the phrase "consisting essentially of" excludes additional material elements, but allows the inclusions of non-material elements that do not substantially change the nature of the invention.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The words "preferable", "preferred", "preferably", "particularly" and "desirably" are used frequently herein to refer to embodiments of the disclosure that may afford particular benefits, under certain circumstances. However, the recitation of one or more preferable, preferred, particular or desirable embodiments does not imply that other embodiments are not useful and is not intended to exclude those other embodiments from the scope of the disclosure.

As used throughout this application, the word "may" is used in a permissive sense—that is meaning to have the potential to—rather than in the mandatory sense.

As used herein, room temperature is 23° C. plus or minus 2° C.

As used herein, number average molecular weight (Mn) and weight average molecular weight (Mw) are determined by gel permeation chromatography (GPC) with tetrahydrofuran (THF) as the eluent in accordance with DIN 55672-1:2007-08. The term polydispersity (PD) is derived from Mw and Mn and is calculated as (Mw/Mn).

Where stated, the hydroxyl number is analyzed in accordance with according to the standard test method ASTM D4274-11.

Viscosities of the composition compositions may be determined using the Brookfield Viscometer, Model RVT at standard conditions of 20° C. and 50% Relative Humidity (RH). The viscometer is calibrated using silicone oils of known viscosities, which vary from 5,000 cps to 50,000 cps. A set of RV spindles that attach to the viscometer are used for the calibration. Measurements of the passivation compositions are done using the No. 6 spindle at a speed of 20 revolutions per minute for 1 minute until the viscometer equilibrates. The viscosity corresponding to the equilibrium reading is then calculated using the calibration.

As used herein, the "glass transition temperature" (Tg) is determined by differential scanning calorimetry (DSC) employing a 20 K/min ramp rate and midpoint measurement in accordance with DIN 53 765.

As used herein, by "$d_{50}$ particle size" is meant that the particle size distribution is such that at least 50% of the particles by weight have a particle size diameter of less than the specified value. Unless otherwise stated, that particle size is determined by laser diffraction.

As defined herein, the term "conversion coating" or "conversion treatment," refers to a treatment of the surface of a substrate which causes the surface material to be chemically converted to a different material.

The term "passivation" refers to a treatment of the surface of a substrate to form a barrier layer to corrosive conditions on said surface but without a cohesive film forming a chemical bond between the surface and the passivation layer. The term "passivation composition" as used herein refers to that composition which actually contacts the zinc-coated or zinc-alloy coated substrate. As is known in the art, such contacting occurs in a so-called "bath" which is shaped, sized and disposed to enable at least part of the substrate to be immersed therein. The passivation bath should moreover be sized to allow for movement of the composition around and throughout the loaded substrate, which movement can be further enhanced with recirculation and/or ultrasonics. The pH of the composition within the bath, the temperature of the bath, and contact time of the substrate are result effective variables which should be monitored either manually or automatically, whenever possible.

Unless otherwise stated, where a molar ratio is given herein with respect "to chromium", this refers to the total content of chromium in the composition, independent of the oxidation state(s) of that metal.

As used herein, the term "alloy" refers to a substance composed of two or more metals or of a metal and a non-metal which have been intimately united, usually by being fused together and dissolved in each other when molten. The term "zinc alloy" therefore denotes an alloy of which zinc metal is a constituent component, which zinc will generally comprise at least 40 wt. %—more typically at least 50 wt. % or at least 60 wt. %—of the alloy, on a metals basis. Metals which may be alloyed with zinc include, but are not limited to, aluminum, tin, nickel, titanium and cobalt. Herein, for a zinc/aluminum alloy, it is preferred that zinc constitutes, on a metals basis, at least 40 wt. % of the alloy and conversely that aluminum constitutes, on a metals basis, up to 60 wt. % of the alloy.

As used herein, "mineral acid" refers to an acid derived from one or more inorganic compounds. A mineral acid is not organic and all mineral acids release hydrogen ions when dissolved in water.

As used herein, "phosphoric acid" refers to ortho-phosphoric acid having the formula $H_3PO_4$, which acid is typically available as an aqueous solution having a concentration up to 75 wt. % $H_3PO_4$. As used herein "phosphonic acid" refers to the phosphorus oxoacid having the formula $H_3PO_3$ that consists of a single phosphorus covalently bound via single bonds to a single hydrogen and two hydroxy groups and via a double bond to an oxygen.

As used herein, the term "α-hydroxycarboxylic acid" means a carboxylic acid having at least one hydroxyl functional group occupying an α-position on said acid (carbon adjacent to a carboxylic acid functional group). The presence of hydroxyl groups occupying positions in the molecule other than the α-position on said acid is not precluded. This α-hydroxycarboxylic acid is included in the present composition in the form of the free acid.

As used herein, the term "monomer" refers to a substance that can undergo a polymerization reaction to contribute constitutional units to the chemical structure of a polymer. The term "monofunctional", as used herein, refers to the possession of one polymerizable moiety. The term "polyfunctional", as used herein, refers to the possession of more than one polymerizable moiety.

The term "ethylenically unsaturated monomer" as used herein, refers to any monomer containing a terminal double bond capable of polymerization under normal conditions of free-radical addition polymerization.

As used herein, an "active hydrogen compound" is a compound that includes at least one hydrogen atom that may be readily dissociated in an aqueous environment. Preferably, the hydrogen atom is attached to a nitrogen atom, an oxygen atom, a phosphorous atom, or a sulfur atom.

A "non-ionic polyurethane" as used herein is one that does not contain a hydrophilic ionizable group.

As used herein, "(meth)acryl" is a shorthand term referring to "acryl" and/or "methacryl". Thus the term "(meth) acrylate" refers collectively to acrylate and methacrylate.

The term "hydrocarbyl group" is used herein in its ordinary sense, which is well-known to those skilled in the art.

As used herein, "$C_1$-$C_n$ alkyl" group refers to a monovalent group that contains 1 to n carbons atoms, that is a radical of an alkane and includes straight-chain and branched organic groups. As such, a "$C_1$-$C_4$ alkyl" group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present invention, such alkyl groups may be unsubstituted or may be substituted with one or more halogen. Where applicable, a preference for a given substituent will be noted in the specification.

The term "$C_1$-$C_{18}$ hydroxyalkyl" as used herein refers to a HO-(alkyl) group having from 1 to 18 carbon atoms, where the point of attachment of the substituent is through the oxygen-atom and the alkyl group is as defined above.

An "alkoxy group" refers to a monovalent group represented by —OA where A is an alkyl group: non-limiting examples thereof are a methoxy group, an ethoxy group and an iso-propyloxy group. The term "$C_1$-$C_6$ alkoxyalkyl" as used herein refers to an alkyl group having an alkoxy substituent as defined above and wherein the moiety (alkyl-O-alkyl) comprises in total from 1 to 6 carbon atoms: such groups include methoxymethyl (—$CH_2OCH_3$), 2-methoxyethyl (—$CH_2CH_2OCH_3$) and 2-ethoxyethyl.

The term "$C_2$-$C_4$ alkylene" as used herein, is defined as saturated, divalent hydrocarbon radical having from 2 to 4 carbon atoms.

The term "$C_3$-$C_6$ cycloalkyl" is understood to mean a saturated, monocylic hydrocarbon group having from 3 to 6 carbon atoms. In the present invention, such cycloalkyl groups may be unsubstituted or may be substituted with one or more halogen. Examples of cycloalkyl groups include: cyclopropyl; cyclobutyl; cyclopentyl; and, cyclohexyl.

As used herein, an "$C_6$-$C_{10}$ aryl" group used alone or as part of a larger moiety—as in "aralkyl group"—refers to monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. In the present invention, such aryl groups may be unsubstituted or may be substituted with one or more halogen. Exemplary aryl groups include: phenyl; ($C_1$-$C_4$)alkylphenyl, such as tolyl and ethylphenyl; indenyl; naphthalenyl; and, tetrahydronaphthyl. And a preference for phenyl groups may be noted.

As used herein, "$C_2$-$C_6$ alkenyl" refers to hydrocarbyl groups having from 2 to 6 carbon atoms and at least one unit of ethylenic unsaturation. The alkenyl group can be straight chained, branched or cyclic and may optionally be substituted with one or more halogen. The term "alkenyl" also encompasses radicals having "cis" and "trans" configurations, or alternatively, "E" and "Z" configurations, as appreciated by those of ordinary skill in the art. Examples of said $C_2$-$C_6$ alkenyl groups include, but are not limited to: —CH=$CH_2$; —CH=$CHCH_3$; —$CH_2$CH=$CH_2$; —C(=$CH_2$)($CH_3$); —CH=$CHCH_2CH_3$; —$CH_2$CH=$CHCH_3$; —$CH_2CH_2$CH=$CH_2$; —CH=C($CH_3$)$_2$; —$CH_2$c(=$CH_2$)($CH_3$); —C(=$CH_2$)$CH_2CH_3$; —C($CH_3$)=$CHCH_3$; —C($CH_3$)$_2$CH=$CH_2$; —CH=$CHCH_2CH_3$; —$CH_2$CH=$CHCH_3$; —$CH_2CH_2$CH=$CHCH_3$; —$CH_2CH_2CH_2$CH=$CH_2$; —C(=$CH_2$)$CH_2CH_2CH_3$; —C($CH_3$)=$CHCH_2CH_3$; —CH($CH_3$)CH=CHCH; —CH($CH_3$)$CH_2$CH=$CH_2$; —$CH_2$CH=C($CH_3$)$_2$; 1-cyclopent-1-enyl; 1-cyclopent-2-enyl; 1-cyclopent-3-enyl; 1-cyclohex-1-enyl; 1-cyclohex-2-enyl; and, 1-cyclohexyl-3-enyl.

The present compositions are defined herein as being "substantially free" of certain compounds, elements, ions or other like components. The term "substantially free" is intended to mean that the compound, element, ion or other like component is not deliberately added to the composition and is present, at most, in only trace amounts which will have no (adverse) effect on the desired properties of the coating. An exemplary trace amount is less than 1000 ppm by weight of the composition. The term "substantially free" encompasses those embodiments where the specified compound, element, ion, or other like component is completely absent from the composition or is not present in any amount measurable by techniques generally used in the art.

DETAILED DESCRIPTION OF THE INVENTION

Component i)

The trivalent chromium ions can be directly introduced to the passivation composition in the form of a bath soluble and compatible compound: salts such as chromium sulfate ($Cr_2(SO_4)_3$), chrome alum (chromium potassium sulfate, $KCr(SO_4)_2$, chromium chloride ($CrCl_3$) and chromium bromide ($CrBr_3$) are particularly suitable for this purpose.

In a preferred alternative, but not necessarily mutually exclusive embodiment, the trivalent chromium is introduced into the passivation composition through the reduction of an aqueous hexavalent chromium-containing solution. Exemplary water soluble hexavalent chromium compounds, which may be used alone or in combination, include: chromium trioxide ($CrO_3$); lithium chromate ($Li_2CrO_4$); lithium dichromate ($Li_2Cr_2O_7$); sodium chromate ($Na_2CrO_4$); sodium dichromate ($Na_2Cr_2O_7$); potassium chromate ($K_2CrO_4$); potassium dichromate ($K_2Cr_2O_7$); ammonium chromate ((NH$_4$)$_2$CrO$_4$) ammonium dichromate ((NH$_4$)$_2$Cr$_2$O$_7$; magnesium chromate (MgCrO$_4$); magnesium dichromate (MgCr$_2$O$_7$); calcium chromate (CaCrO$_4$); calcium dichromate (CaCr$_2$O$_7$); zinc chromate (ZnCrO$_4$); and, zinc dichromate (ZnCr$_2$O$_7$). A preference for the use of chromium trioxide (CrO$_3$), sodium chromate (Na$_2$CrO$_4$), sodium dichromate (Na$_2$Cr$_2$O$_7$), potassium chromate (K$_2$CrO$_4$) and potassium dichromate (K$_2$Cr$_2$O$_7$) may be mentioned. Good results have, in particular, been obtained where chromium trioxide is employed: this compound may alternatively be known in the art as anhydrous chromic acid.

The concentration of the trivalent chromium ions in the aqueous passivation composition will conventionally be from 0.01 moles/liter up to saturation; concentrations of from 0.05 to 0.50 moles/liter, for example from 0.05 to 0.40 moles/liter are preferred.

Component ii)

The composition of the present invention comprises at least one α-hydroxycarboxylic acid represented by the General Formula (I):

R$^1$CH(OH)COOH  (I)

wherein: R$^1$ represents a hydrogen atom, a C$_1$-C$_4$ alkyl group, a C$_2$-C$_6$ alkenyl group, a C$_1$-C$_6$ alkoxy group, a C$_3$-C$_6$ cycloalkyl group or a C$_6$-C$_{10}$ aryl group.

Suitable α-hydroxycarboxylic acids include but are not limited to: glycolic acid; lactic acid (2-hydroxypropanoic acid); 2-hydroxybutanoic acid; 2-hydroxypentanoic acid; 2-hydroxyhexanoic acid; glucuronic acid; citric acid; mandelic acid; galacturonic acid; ribonic acid (2,3,4,5-tetrahydroxypentanoic acid); tartronic acid; tartaric acid; and, malic acid.

In a preferred embodiment, said at least one α-hydroxycarboxylic acid is selected from the group consisting of: glycolic acid; lactic acid (2-hydroxypropanoic acid); 2-hydroxybutanoic acid; 2-hydroxypentanoic acid; and, 2-hydroxyhexanoic acid. More particularly, the α-hydroxycarboxylic acid(s) of the coating composition should comprise or consist of glycolic acid.

The α-hydroxycarboxylic acids are preferably included in the compositions in an amount such that the molar ratio of carboxylic acid groups to chromium is in the range from 1.5:1 to 0.5:1. For example, α-hydroxycarboxylic acids having one carboxylic acid group, such as glycolic acid and the other aforementioned preferred acids, may be included in the compositions such that the molar ratio of carboxylic acid groups to chromium does not exceed 1.5:1, more preferably does not exceed 1.3:1, but preferably is at least 0.5:1.

Without being bound by theory, it is considered that the α-hydroxycarboxylic acids are effective reducing agents and readily convert a hexavalent chromium containing solution to a passivation solution of this invention. In this respect, it was observed that a passivation solution that is obtained from aqueous solutions comprising hexavalent chromium after reduction in the presence of a molar excess amount of α-hydroxycarboxylic acid, especially glycolic acid, provide highly stable solutions which is a clear benefit when concentrated passivation solutions having reduced amounts of water are to be prepared.

For completeness, the present invention does not preclude the presence of inorganic reducing agents in the composition and indeed this may be useful to guarantee complete reduction of the added Cr(VI). Suitable inorganic reducing agents include but are not limited to: alkali metal iodides; tin (II) compounds, such as SnSO$_4$ and SnCl$_2$·2H$_2$O; antimony (III) compounds; ferrous salts, such as ferrous sulphate heptahydrate (HH), ferrous sulphate monohydrate (MH) and ammonium ferrous sulphate; sulfur dioxide; and, alkali metal sulfites, bisulfites and metabisulfites.

Component iii)

The composition comprises by necessity phosphoric acid. The added amount thereof may be quantified as that required to adjust the pH of the passivation composition to a value of less than 3, in particular to a pH of from 1.0 to 2.5 or from 1.0 to 2.0. However, in an alternative but not mutually exclusive condition, the molar ratio of phosphoric acid to chromium should be at least 2:3 and may for example be in the range from 2:3 to 1:1.

Component iv)

The composition of the present invention further comprises at least one compound having both a thiol group (—SH) and a carboxyl group (—CO$_2$H). Suitable compounds, which may be used alone or in combination, include but are not limited to: thioglycolic acid; dithioglycolic acid; thio-di-glycolic acid; thiocoumaric acid; thiolactic acid; thiomalic acid; di-thiopropionic acid; homocysteine; and, cysteine. A preference may be noted for thiomalic acid, thioglycolic acid, thiocoumaric acid, cysteine and thiolactic acid. Good results have been obtained for thiomalic acid and cysteine.

The component iv) is typically added in an amount of from 1 to 10 wt. %, for example from 1 to 8 wt. % or from 1 to 6 wt. %, based on the weight of the composition. The pH of the composition may again be determinative of the specific amount of this component in a given circumstance.

In an alternative expression which is not intended to be mutually exclusive of that defined above, the molar ratio of iv) said compound(s) having both a thiol group (—SH) and a carboxyl group (—CO$_2$H) to ii) said α-hydroxycarboxylic acid(s) should be in the range from 1:3 to 3:1.

Component v)

The passivation composition comprises at least one water-soluble or water-dispersible fluoroacid or a salt thereof, wherein said fluoroacid is defined by the following general empirical formula (II):

H$_p$T$_q$F$_r$O$_s$  (II)

wherein: each of q and r represents an integer from 1 to 10;

each of p and s represents an integer from 0 to 10; and,

T represents an element selected from the group consisting of Ti, Zr, Hf, Si, Sn, Al, Ge, and B.

Preferred fluoroacids of empirical formula (II) include compounds where: T is selected from Ti, Zr, or Si; p is 1 or 2; q is 1; r is 2, 3, 4, 5 or 6; and, s is 0, 1, or 2.

Exemplary fluoroacids used in the present invention may be selected from the group consisting of: fluorotitanic acid (H$_2$TiF$_6$); fluorozirconic acid (H$_2$ZrF$_6$); fluorosilicic acid (H$_2$SiF$_6$); fluoroboric acid (HBF$_4$); fluorostannic acid (H$_2$SnF$_6$); fluorogermanic acid (H$_2$GeF$_6$); fluorohafnic acid (H$_2$HfF$_6$); and, fluoroaluminic acid (H$_3$AlF$_6$). Preferred fluoroacids are: fluorotitanic acid (H$_2$TiF$_6$) and fluorozirconic acid (H$_2$ZrF$_6$).

Subject to the condition that the salt is water-soluble or water dispersible, one or more of the H atoms of the aforementioned fluoroacids may be replaced by suitable cations, such as ammonium, alkaline earth metal cations or alkali metal cations. The salts of alkali metal cations and ammonium are preferred in this context and mention may therefore be made of the following examples of suitable fluoroacid salts: (NH$_4$)$_2$ZrF$_6$; H(NH$_4$)ZrF$_6$; (NH$_4$)$_2$TiF$_6$; H(NH$_4$)$_2$TiF$_6$; Na$_2$ZrF$_6$; K$_2$ZrF$_6$; Li$_2$ZrF$_6$; Na$_2$TiF$_6$; K$_2$TiF$_6$; and, Li$_2$TiF$_6$.

Such salts may be added directly to the composition or may be produced in situ in the aqueous passivation composition by the partial or full neutralization of the acid fluoride or acid oxyfluoride with an appropriate base. It is noted that said base may be organic or inorganic in character: ammonium bicarbonate and hydroxylamine might be used, for instance.

Based on the amount of mineral acids in toto, the fluoroacid or salt thereof should conventionally be included in the composition such that the molar ratio of mineral acid to the metal (T) of said fluoroacid is in the range from 10:1 to 1:1, preferably from 6:1 to 1:1 and more preferably 4:1 to 1:1. When the level of mineral acid is outside the above ranges, the stability of the formulation is diminished: at lower levels of mineral acid within the stated ranges, the concomitant loss of stability of the formulation can be mitigated by increasing the amount of divalent metal cations in the composition. When the level of metal (T) falls below the stated molar ranges, the stability of the composition may be substantively affected but a decline in performance in the neutral salt spray (NSS) may be observed.

In an alternative but not mutually exclusive expression, said fluoroacid or salt thereof v) should be included in the passivation composition in an amount of from 1 to 10 wt. %, for example from 1 to 5 wt. %, based on the weight of the composition.

The presence of other complex fluoride anions in the passivation composition is not precluded and mention in this regard may be made of: fluoroindates (e.g. $InF_4^{-1}$); fluorophosphates (e.g. $PF_6^{-1}$); fluoroarsenates (e.g. $AsF_6^{-1}$); fluoroantimonates (e.g. $SbF_6^{-1}$); fluorobismuthates (e.g. $BiF_6^{-1}$); fluoro sulfates (e.g. $SF_6^{-2}$); fluoroselenates (e.g. $SeF_6^{-2}$); fluorotellurates (e.g. $TeF_6^{-2}$ or $TeOF_5^{-1}$); fluorocuprates (e.g. $CuF_3^{-1}$); fluoroargentates; fluorozincates (e.g., $ZnF_4^{-2}$); fluorovanadates (e.g. $VF_7^{-2}$); fluoroniobates (e.g. $NbF_7^{-2}$); fluorotantalates (e.g. $TaF_7^{-2}$); fluoromolybdates (e.g. $MoF_6^{-3}$); fluorotungstates (e.g. $WF_6^{-1}$); fluoroyttrates (e.g. $YF_6^{-3}$); fluorolanthanates (e.g. $LaF_6^{-3}$); fluorocerates (e.g. $CeF_6^{-3}$ or $CeF_6^{-2}$); fluoromanganates (e.g. $MnF_6^{-2}$); fluoroferrates (e.g. $FeF_6^{-3}$); fluoronickelates; and fluorocobaltates. Such anions may be included in the form of water-soluble or water dispersible salts, in particular the ammonium, alkaline earth metal or alkali metal salts. When present, said complex fluoride anions should be included in the composition in an amount up to 0.1 moles/litres, for example up to 0.05 moles/litre.

The presence in the passivation composition of free fluoride ions—not bound in complex form—is also not precluded as the fluoride anions can act as accelerators in the formation of passivation coatings and are present at the interface between the conversion coating and the metal matrix. Such free fluoride anions can be included through the addition to the passivation compositions of, for example: hydrofluoric acid; alkali metal fluorides, such as sodium fluoride; alkali metal hydrogen fluorides, such as sodium hydrogen fluoride; ammonium fluoride; and, ammonium hydrogen fluoride.

This aside, the presence of free fluoride ions—not bound in complex form—is not preferred. Despite the utility of the fluoride species in the passivation compositions, the environmental release of fluoride is problematic as documented in https://www.cdc.gov/niosh/. Thus, it is preferred that the passivation composition be substantially free of free fluoride anions.

Adjunct Ingredients

The compositions of the present invention will typically further comprise adjunct ingredients, which are necessarily minor components but which can nevertheless impart improved properties to these compositions. The total amount of adjunct ingredients in the compositions will generally be from 0 to 10 wt. %, and preferably from 0.1 to 10 wt. % or from 0.1 to 7.5 wt. %, based on the total weight of the composition. The desired viscosity of the compositions will usually be determinative of the total amount of adjunct materials added but the above recited pH of the passivation composition may be determinative of the added amount of adjunct acidic ingredients.

As preferred adjunct ingredients, which may be used alone or in combination, mention may be made of: carboxylic acids; mineral acids; divalent metal cation(s); and, transition metal salts and/or transition metal complexes.

In the addition to the aforementioned α-hydroxycarboxylic acids, the composition of the present invention may optionally contain at least one further carboxylic acid (FC), wherein said further carboxylic acid is an alkyl, aryl, alkenyl or alkynyl carboxylic acid which is characterized in that it does not contain polar, in particular protic, groups with exception of the carboxylic group(s). In particular, said further carboxylic acid should not contain any of the following groups: —OH, —SH, —$SO_3H$, —$NH_2$, —$NHR^3$, —$N(R^3)_2$ or —$N(R^3)_3^+$, wherein each $R^3$ independently represents a $C_1$-$C_6$ alkyl group. Said carboxylic acid (FC) may, however, contain the following groups: halogen; alkyl; aryl; vinyl; alkoxy; and, nitro groups.

Examples of acids which are suitable as said carboxylic acid (FC) include, but are not limited to: formic acid; acidic acid; propionic acid; butyric acid; iso-butyric acid; valeric acid; hexanecarboxylic acid; cyclopentanecarboxylic acid; acetylsalicylic acid; benzoic acid; nitrobenzoic acid; 3,5-dinitrobenzoic acid; sorbic acid; trifluoracetic acid; 2-ethylhexanoic acid; acrylic acid; chloroacetic acid; 2-chlorobenzoic acid; 2-chloro-4-nitrobenzoic acid; cyclopropanecarboxylic acid; methacrylic acid; 3-nitrobenzoic acid; phenoxyacetic acid; isovaleric acid; pivelinic acid; 2-ethylbutyric acid; furan-2-carboxylic acid; bromoacetic acid; crotonic acid; 2-chloropropionic acid; dichloroacetic acid; glyoxilic acid; 4-methoxybenzoic acid; 3,4-dimethoxybenzoic acid; levulinic acid; pentenoic acid; phenylacetic acid; tiglic acid; and, vinylacetic acid.

When added to the present compositions, said further carboxylic acid(s) (FC) should in toto only be present in an amount up to 10 mol. %, preferably up to 5 mol. %, based on the total number of moles of the α-hydroxycarboxylic acid, included as component ii).

In addition to the aforementioned phosphoric acid, the passivation compositions may comprise one or more further mineral acids: the use of nitric acid is precluded but, conversely, the addition of at least one of phosphoric acid, phosphonic acid, sulphurous acid, sulphuric acid, hydrochloric acid and hydrobromic acid is considered to be particularly suitable. A particular preference for the use of at least one of phosphonic acid, sulphurous acid and sulphuric acid may be mentioned. The above recited pH of the passivation composition is somewhat determinative of the added amount of such acid(s). Within that pH constraint, the presence of phosphonate or sulphate ions in the treatment bath in concentrations of up to 5% by weight and, more particularly, between 0.1 and 3% by weight can be advantageous.

The passivation composition may further contain at least one divalent metal cation ($M^{2+}$). In preferred embodiments, said at least one divalent metal cation (M) is selected from the group consisting of: $Mg^{2+}$; $Ca^{2+}$; $Mn^{2+}$; $Co^{2+}$; $Ni^{2+}$; $Sr^{2+}$; $Ba^{2+}$; and, $Zn^{2+}$. The foregoing metal ions or mixtures thereof are most conveniently introduced into the composition as metal oxides, metal hydroxides and/or soluble and compatible metal salts, including but not limited to sulfate and halide salts. The use of nitrate and fluoride salts for this purpose is not preferred, however.

In certain embodiments of the present invention, the passivation composition comprises magnesium ($Mg^{2+}$) and/or manganese ($Mn^{2+}$). This magnesium and manganese are desirably introduced into the aqueous passivation composition as one or more of: manganese chloride; manganese sulphate; magnesium oxide, magnesium hydroxide; magnesium sulphate; and, magnesium chloride. A preference for magnesium oxide or magnesium hydroxide may be noted.

When present, the total amount of the divalent metal cations ($M^{2+}$) in the aqueous composition should not exceed 5 wt. % and preferably should not exceed 2.5 wt. %, based on the weight of the composition.

It is considered that the corrosion-protection performance of the disclosed passivation compositions—and resulting passivate films—can be enhanced by the incorporation of a transition metal salt and/or a transition metal complex therein. Considered particularly useful in this regard are the salts or complexes of transition metals selected from the group consisting of Ce, Ni, Co, V, Fe, Zn, Zr, Mn, Mo, W, Ti, Zr, Hf, Bi and the lanthanides.

Whilst said transition metals may be present in the complex fluoride anions mentioned hereinabove, such transition metals may alternatively or additionally be included in the composition as complexes with other ligands and/or as salts with further anions, provided said salts are at least partially soluble in water. As examples of anions, there may be mentioned: oxide; hydroxide; sulphate; chloride; iodide; citrate; lactate; succinate; formate; oxalate; malonate; and, acetate. As exemplary ligands for transition metal complexes, there may be mentioned: ethylenediaminetetraacetic acid (EDTA); diethylenetriaminepentaacetic acid (DTPA); hydroxyethylethylenediaminetriacetic acid (HEDTA); nitrilotriacetic acid (NTA); and, methylglycinediacetic acid (MGDA).

Those preferred adjuncts aside, the present compositions may further comprise adjunct ingredients which are conventional in this field; in particular, the compositions might comprise: film-forming organic polymers, such as acrylic polymers and non-ionic polyurethanes; waxes; corrosion inhibitors, such as dialkylthioureas, cupric sulphate and copper sulphate; adhesion promoters; non-ionic surfactants; wetting agents; de-foaming agents; sequestrants; lubricants; and, mixtures thereof. As further exemplary corrosion inhibitors mention may be made of the following commercial materials: the Rodine® series, available from JMN Specialties, Inc. and Henkel Corporation; the Dodicor® series, available from Clariant AG; and, the Armohib® series available from Akzo Nobel Surfactants LLC.

To facilitate their inclusion in the compositions of the present invention, film-forming organic polymers should be initially provided as an aqueous dispersion, the particles of which dispersion may desirably be characterized by a $d_{50}$ particle size of less than 1 micron, for instance of from 20 to 500 nm, as measured by dynamic light scattering.

As regards the optional inclusion of a film-forming non-ionic polyurethane, said polyurethane should be non-functional by which is meant the polyurethane contains substantially no un-reacted isocyanate or isocyanate-reactive groups. As is known in the art, suitable non-ionic polyurethanes may be obtained from the reaction of: i) at least one polyol; ii) optionally further active hydrogen compounds; and, iii) at least one polyisocyanate compound. In this context, the equivalence ratio of the active hydrogen to NCO groups of the reactants should be selected to ensure that no free NCO groups are present: the equivalence ratio might therefore be at least 1:1 and preferably from 1:1 to 1.2:1.

The composition of the present invention may, in certain embodiments, comprise at least one finely divided wax. When present, the composition may comprise up to 5 wt. % of said wax, for example from 1 to 5 wt. %, based on the weight of the composition.

The term "wax" is known to the person skilled in the art and reference may be made to the definition in *Ullmann's Encyclopedia of Industrial Chemistry*, 6th Edition, Electronic Release (1998). However, without intention to limit the present invention, exemplary waxes include: paraffin wax [CAS No. 8002-74-2]; polyethylene wax [CAS No. 9002-88-4]; polyethylene-polypropylene waxes; co-polymeric polyethylene waxes, for example copolymers of ethylene with at least one monomer selected from (meth)acrylic acid, maleic anhydride, vinyl acetate and vinyl alcohol, which copolymers are available under, for instance CAS Nos. 38531-18-9, 104912-80-3 and 219843-86-4; polybutene waxes; Fischer-Tropsch waxes; oxidized waxes, for example oxidized polyethylene wax [CAS No. 68441-17-8]; polar modified polypropylene waxes; microcrystalline waxes, for example microcrystalline paraffin waxes [CAS No. 63231-60-7]; montan wax and montan wax raffinates; montanic acids and salts and esters thereof; fatty acid amides such as erucamide [CAS No. 112-84-5], oleamide [CAS No. 301-02-0] and 1,2-ethylenebis(stearamide) [CAS No. 110-30-5]; and, carnauba wax.

It is preferred that any waxes included in the present composition meet at least one of the following conditions: a) an acid number of less than 200 mg KOH/g, preferably less than 100 mg KOH/g; b) a melting point of from 40 to 200° C., preferably from 60 to 180° C.; and, c) a number average molecular weight (Mn) of at least 200 g/mol, preferably at least 400 g/mol. For completeness, these conditions are not intended to be mutually exclusive: waxes may meet one, two or three of these conditions.

A particular preference may be noted for the use of at least one wax selected from polyethylene waxes, oxidized polyethylene waxes, polypropylene waxes, oxidized polypropylene waxes and co-polymeric waxes based on ethylene or propylene as the main monomers, wherein said at least one wax is further characterized by a number average molecular weight (Mn) of from 400 to 30 000 g/mol, preferably from 1000 to 25 000 g/mol.

To facilitate their inclusion in the compositions of the present invention, waxes may be provided: in finely divided powder form, in particular in a micronized form characterized by a $d_{50}$ particle size of less than 20 microns, as measured by laser diffraction; and/or; as an aqueous dispersion, the particles of which dispersion may desirably be characterized by a $d_{50}$ particle size of less than 1 micron, for instance of from 20 to 500 nm, as measured by dynamic light scattering.

Exemplary Embodiment

In accordance with an exemplary embodiment of the present invention there is provided an aqueous passivation composition for the treatment of zinc or zinc alloy coatings, said composition having a pH of from 1.0 to 2.5 and comprising:
  from 0.05 to 0.5 moles/liter i) of trivalent chromium (Cr(III)) ions;

ii) at least one α-hydroxycarboxylic acid represented by the General Formula (I):

wherein: $R^1$ represents a hydrogen atom, a $C_1$-$C_4$ alkyl group, a $C_2$-$C_6$ alkenyl group, a $C_1$-$C_6$ alkoxy group, a $C_3$-$C_6$ cycloalkyl group or a $C_6$-$C_{10}$ aryl group;

iii) phosphoric acid;

iv) at least one compound having both a thiol group (—SH) and a carboxyl group (—$CO_2H$), said at least one compound being selected from the group consisting of thiomalic acid, thioglycolic acid, thiocoumaric acid, cysteine and, thiolactic acid;

v) at least one water-soluble or water-dispersible fluoroacid or a salt thereof, wherein said fluoroacid is defined by the General Formula (IIA):

wherein: T is selected from Ti, Zr, or Si;
p is 1 or 2;
q is 1;
r is 2, 3, 4, 5 or 6; and,
s is 0, 1, or 2,
and wherein said fluoroacid is included in an amount such that molar ratio of total mineral acid in the composition to the metal (T) of said fluoroacid is in the range from 4:1 to 1:1; and,
from 50 to 80 wt. %, based on the weight of the composition, of water,
wherein said composition is characterized in that it is substantially free of nitrate anions and is substantially free of hexavalent chromium (Cr(VI)).

Preparation of the Passivation Compositions

The aqueous passivation compositions are formulated by simple mixing of the various components i) to v) as well as any adjunct ingredients. In an alternative route, the passivation compositions of this invention can be obtained through mixing a portion comprising hexavalent chromium (Cr(VI)) dissolved in water with an amount of α-hydroxycarboxylic acids according to component ii), preferably comprising or consisting of glycolic acid, in molar excess preferably to such extent that a molar ratio of carboxylic acid groups to chromium in the range from 1.1:1 to 2.5:1 is established and thereafter adding the components iii) to v) to said mixture.

If necessary, the compositions may be prepared well in advance of its application. However, in an interesting alternative embodiment, a concentrated composition may first be obtained by mixing components with only a fraction of the water that would be present in the composition as applied: the concentrated composition may then be diluted with the remaining water shortly before its application. It is considered that such concentrated compositions may be prepared and stored as either single-package concentrates—that can be converted by dilution with water only—or as multi-part concentrates, two or more of which must be combined and diluted to form a complete working composition according to the invention. Any dilution can be effected simply by the addition of water, in particular deionized and/or demineralized water, under mixing. The composition might equally be prepared within a rinse stream whereby one or more streams of the concentrate(s) is injected into a continuous stream of water.

Without specific intention to limit the amount of water included in the passivation compositions, it is preferred that said compositions contain from 30 to 80 wt. %, preferably from 40 to 80 wt. % and more preferably from 50 to 80 wt. %, based on the weight of the composition, of water. In an alternative but not mutually exclusive characterization, the passivation composition may be defined by a viscosity of from 0.005 to 1 Pa·s (50 cps to 1000 cps), as measured using a Brookfield viscometer at 25° C.

Methods and Applications

Whilst the present invention is concerned with passivating of surfaces of zinc or zinc alloys, there is no intention to limit the base substrate to which that zinc or zinc alloy may have been applied nor the method of such application. As such, suitable base metal substrates may include but not be limited to iron, nickel, copper, aluminum and alloys thereof: substrates comprising or consisting of steel may be mentioned in particular. Such metal and alloy substrates may be provided in various forms, including sheets, plates, cuboids, spheres, annuli, solid cylinders, tubes and wires: the provision of substrates in more complex, shaped forms—obtained by conventional techniques such as bending, blanking, casting, forging, rolling and welding—is of course not precluded. Moreover, the plating or coating of zinc or zinc alloy may be applied to such base substrates by: electroplating; galvanizing, including hot-dip galvanizing and thermal diffusion galvanizing; and, galvannealing. By way of example only, the passivation compositions and methods of the present invention may have utility in the treatment of: galvanized and galvanneal steel meeting the requirements of ASTM Designation A653; GALVALUME®, a 55% Al/43.4% Zn/1.6% Si alloy coated sheet steel available from Bethlehem Steel Corporation; and, GALFAN®, a 5% Al/95% Zn alloy coated sheet steel available from Weirton Steel Corporation.

In accordance with process aspects of the present invention, it is often advisable to remove foreign matter from the coated or plated metal substrate by cleaning and degreasing the relevant surfaces. Such treatments are known in the art and can be performed in a single or multi-stage manner constituted by, for instance, the use of one or more of: a waterborne alkaline degreasing bath; a waterborne cleaning emulsion; a cleaning solvent, such as carbon tetrachloride or trichloroethylene; and, a water rinse, preferably of deionized or demineralized water. In those instances where a waterborne alkaline degreasing bath is used, any of the degreasing agent remaining on the surface should desirably be removed by rinsing the substrate surface with deionized or demineralized water. Irrespective of the cleaning or degreasing agent applied, the so-treated substrate should not be subjected to an intermediate drying step prior to either the passivation treatment or to any subsequent pre-treatment step which precedes said passivation treatment.

As therefore intimated above, the present invention does not preclude the pre-treatment of the zinc or zinc alloy surface, independently of the performance of cleaning and/or degreasing steps. Such pre-treatments are known in the art and reference in this regard may be made to: German Patent Application No. DE 197 33 972 A1; German Patent Application No. DE 10 2010 001 686 A1; German Patent Application No. DE 10 2007 021 364 A1; and, US Patent Application Publication No. 2014/360630. In particular, the surface may be treated with a primer with the intention of facilitating the later adhesion of the passivate film.

After said cleaning, degreasing and/or pre-treatment steps, the passivation composition is applied to the substrate. The passivation composition may be applied at ambient temperature or the temperature of the passivation compositions may be elevated prior to application to, for instance, a temperature in the range from 30° C. to 90° C., for instance from 30° C. to 70° C.

To produce a double-face plated sheet, it is conventional commercially that an operating bath as hereinbefore described is prepared and the passivation composition is applied to the substrate by, without limitation, immersion, flooding, air-atomized spraying, air-assisted spraying, airless spraying, high-volume low-pressure spraying and air-assisted airless spraying. The minimum contact time of the composition with the substrate is most broadly that time which is sufficient to form the desired passivate film thereon: that contact time can be as little as 1 second or as great as 15 minutes in that instance where the passivation or conversion treatment is being performed on metal that will be cold worked: however, dependent upon the pH and the concentration of the applied solution, a contact time of from 5 to 300 seconds, for example from 5 to 50 seconds, would be more typical.

In certain circumstances it will only be necessary to form a passivate film on a single surface of the substrate: forming passivate films on both the inner and outer surfaces of a plated steel substrate, for example, may be deleterious to the subsequent weldability of that substrate. Techniques for applying the passivate composition to only a singular surface include but are not limited to: painting; brushing; roll coating; wiping; air-atomized spraying; air-assisted spraying; airless spraying; high-volume low-pressure spraying; and, air-assisted airless spraying.

At the conclusion of the application step, the article is dried using, for instance, ambient air drying, circulating warm air, forced air drying or infrared heating. The surface temperature of the substrate is controlled during drying: the peak metal temperature (PMT) need not exceed 100° C. and should, more particularly be in the range from 20 to 90° C., for example 50 to 75° C.

Subsequent to drying, it is not precluded that the article be subjected to: at least one water rinse to remove residual passivation composition therefrom; and/or, rinsing with a dilute silicate solution based. The rinsed substrate may be dried after completion of the rinsing step(s) or, if applicable, after each rinse solution.

The above described treatment should desirably yield a protective passivate monolayer over the zinc or zinc alloy, which monolayer has a film weight of from 25 to 500 mg/m$^2$, preferably from 25 to 250 mg/m$^2$ or from 25 to 100 mg/m$^2$. If the film weight is less than 25 mg/m$^2$, the passivate film may impart insufficient corrosion resistance. If the film weight is larger than 500 mg/m$^2$, the adhesion of the passivate film to the surface will be insufficient, such that exfoliation of the coating may occur during further processing of the substrate.

The composition according to the present invention yields a passivate film that is either colorless, or blue or olive in color, with a flat to glossy finish. The exact nature of that finish is determined predominantly by the base substrate, the zinc or zinc alloy coating, and the immersion time in the conversion coating composition. Zinc or zinc alloy coatings passivated in accordance with the present invention exhibit corrosion protection for at least 250 hours before the observed onset of white rust corrosion, as defined by ASTM B-201. Alternatively or additionally, said zinc or zinc alloy coatings passivated in accordance with the present invention exhibit corrosion protection for at least 72 hours before the observed onset of white rust corrosion (as defined by ASTM B-201) when treated with neutral salt spray (NSS, 5 wt. % NaCl, 95 wt. % H$_2$O) under steady state conditions in accordance with the procedure of ASTM B-117.

The present invention does not preclude supplementary conversion coatings being applied to the passivate film obtained in accordance with the present invention; indeed such supplementary coatings may further extend corrosion protection of the finished article. Inorganic coatings based on silicates and organic conversion coatings based on epoxy resins might be mentioned as non-limiting examples of supplemental conversion coatings: reference in this regard may be made to inter alia U.S. Pat. No. 5,743,971 (Inoue) and U.S. Pat. No. 5,855,695 (McMillen). These supplemental conversion coatings may be applied by any suitable means known in the art, such as by dipping, spraying, roll-coating, electro-coating or powder coating.

Various features and embodiments of the disclosure are described in the following examples, which are intended to be representative and not limiting.

EXAMPLES

Aqueous passivation compositions were prepared by mixing the ingredients given in Table 1 herein below:

TABLE 1

| Ingredient | Percentage by Weight of Composition (wt. %) | | | |
| --- | --- | --- | --- | --- |
| | Reference Example 1 | Reference Example 2 | Example 1 | Example 2 |
| Demineralized Water | 55-65 | 50-60 | 60-67 | 60-67 |
| Phosphoric acid (85% concentration) | 0.5-1.0 | 14-18 | 3-9 | 3-9 |
| H$_2$TiF$_6$ (50% concentration) | | | 5-9 | 5-9 |
| Chromium(6+)oxide CrO$_3$ | 18-22 | 2-5 | 4-10 | 4-10 |
| Glycolic acid (70% concentration) | | | 7-13 | 7-13 |
| L-Cysteine | | | 1-6 | |
| Thiomalic acid | | | | 1-6 |
| Sorbitol (70% concentration) | | 1-3 | | |
| Chromium (IIII) nitrate (44% concentration) | | 3-7 | | |
| Colloidal silica | 15-22 | 12-20 | | |

Based on these tabulated aqueous compositions, the following tests were performed utilizing both the aqueous passivation compositions of the present invention and the reference compositions.

Test Panel:

Specimens of Advanced Coating Technology (ACT) G-90 hot dipped galvanized steel were mechanically cut into squares of 4 cm×4 cm dimensions. Each obtained panel was treated with an alkaline cleaner at 55° C. for 10 seconds, rinsed with tap water at room temperature and then dried by squeegeeing.

Standard Test Panel Preparation:

Each passivation composition selected for evaluation was applied to one surface of the panels by roller coater: nine panels were prepared from the aqueous passivation compositions according to the present invention; and, quadruplicate panels were prepared for each reference passivation composition. The resultant coated test panels were then baked to the peak metal temperature (PMT) given in Table 2 herein below. The obtained coating weight of the test panels was determined on a metals basis and is also given in Table 2.

The as passivated hot dip galvanized steel panels were then roller coated at one surface of the panels with a primer in a dry film thickness of 4-6 μm at a PMT of 216-220° C. The primer used was either a non-chrome primer (Nippon Paint (India) Private Limited, product code 5000-00088)

compliant with ROHS (Restriction of Hazardous Substances Directive 2002/95/ EC) or a PU based, chrome containing primer (Nippon Paint (India) Private Limited, product code 5000-00001).

The as primed surfaces of the passivated hot dip galvanized steel panels were then roller coated with a polyester topcoat (Nippon Paint (India) Private Limited, product code 1300-04585) in a dry film thickness of 18-20 μm at a PMT of 220-224° C.

Neutral Salt Spray (NSS):

This test was carried out according to ASTM B117 with a 5% NaCl solution at 35° C. (https://www.astm.org/Standards/B117). The coated panels were disposed in the spray chamber (ERICHSEN Model 606/400 L) at 15-30° from the vertical for the durations indicated in Table 2. The test panels were not allowed to contact other surfaces in the chamber and condensed or corrosion products on their surfaces were not permitted to cross-contaminate each other. Photographic recording of the test panels was performed each 24 hours. After exposure, test panels were rinsed in deionized water to remove salt deposits from their surface and then immediately dried. A visual inspection of the coated panels was undertaken after 500 hours.

TABLE 2

| Test Parameters | Reference Example 1 | Reference Example 2 | Example 1 | Example 2 |
|---|---|---|---|---|
| pH | 1.5-3.0 | 0.7-1.5 | 1.0-1.5 | 1.0-1.5 |
| Coating wt. measured as Cr (mg/m²/side) | 40-45 | 40-45 | 40-45 | 40-45 |
| PMT (° C.) | 55-60 | 55-60 | 55-60 | 55-60 |
| NSS Test (500 hours), ROHS Primer | >1 mm creepage | >2 mm creepage | No major observed creepage | No major observed creepage |
| NSS Test (500 hours), non-ROHS Primer | >2 mm creepage | >2 mm creepage | <1 mm creepage | <1 mm creepage |
| NSS Test (72 hours), unprimed substrate | Fail, 100% rust within 24 hours | Fail, 100% rust within 24 hours | Pass | Pass |

Based on these results, it is evident that the Reference Examples failed to provide comparable corrosion protection to the Examples in accordance with the present invention when applied to either primed or unprimed (bare) substrate.

In view of the foregoing description and examples, it will be apparent to those skilled in the art that equivalent modifications thereof can be made without departing from the scope of the claims.

The invention claimed is:

1. An aqueous passivation composition for treating zinc or zinc alloy coatings, said composition having a pH of less than 3 and comprising:
   i) a source of trivalent chromium (Cr(III)) ions, wherein the trivalent chromium ions (Cr(III)) are present in a concentration of from 0.05 to 0.50 moles/liter;
   ii) at least one α-hydroxycarboxylic acid represented by the General Formula (I):

$$R^1CH(OH)COOH \qquad (I)$$

wherein: $R^1$ represents a hydrogen atom, a $C_1$-$C_4$ alkyl group, a $C_2$-$C_6$ alkenyl group, a $C_1$-$C_6$ alkoxy group, a $C_3$-$C_6$ cycloalkyl group or a $C_6$-$C_{10}$ aryl group;
   wherein ii) comprises glycolic acid;
   iii) phosphoric acid;
   iv) from 1 to 10 wt. %, based on weight of the composition, of at least one compound having both a thiol group (—SH) and a carboxyl group (—CO2H); and,
   v) from 1 to 10 wt. %, based on the weight of the composition, of at least one water-soluble or water-dispersible fluoroacid or a salt thereof, wherein said fluoroacid is defined by the General Formula (II):

$$H_pT_qF_rO_s \qquad (II)$$

wherein: each of q and r represents an integer from 1 to 10;
   each of p and s represents an integer from 0 to 10; and, "T" represents an element selected from the group consisting of Ti, Zr, Hf, Si, Sn, Al, Ge, and B;
   wherein said composition is substantially free of nitrate anions and is substantially free of hexavalent chromium (Cr(VI)); wherein said composition comprises from 30 to 80 wt. %, based on the weight of the composition, of water; and is obtainable through mixing a portion comprising hexavalent chromium dissolved in water with a molar excess of the at least one α-hydroxycarboxylic acid according to component ii), forming a mixture comprising the trivalent chromium ions of b) by reduction of said hexavalent chromium; and thereafter, adding the components iii) to v) to said mixture.

2. The composition according to claim 1, wherein i) the source of trivalent chromium ions comprises a source of hexavalent chromium ions (Cr(VI)) and wherein the composition comprises at least one reducing agent in an amount sufficient to ensure complete reduction of the hexavalent chromium to trivalent chromium.

3. The composition according to claim 2, wherein said source of hexavalent chromium ions (Cr(VI)) is selected from the group consisting of: chromium trioxide ($CrO_3$); lithium chromate ($Li_2CrO_4$); lithium dichromate ($Li_2Cr_2O_7$); sodium chromate ($Na_2CrO_4$); sodium dichromate ($Na_2Cr_2O_7$); potassium chromate ($K_2CrO_4$); potassium dichromate ($K_2Cr_2O_7$); ammonium chromate (($NH_4)_2CrO_4$) ammonium dichromate (($NH_4)_2Cr_2O_7$); magnesium chromate ($MgCrO_4$); magnesium dichromate ($MgCr_2O_7$); calcium chromate ($CaCrO_4$); calcium dichromate ($CaCr_2O_7$); zinc chromate ($ZnCrO_4$); and, zinc dichromate ($ZnCr_2O_7$).

4. The composition according to claim 1, wherein the trivalent chromium ions (Cr(III)) of i) are present in a concentration of from 0.05 to 0.40 moles/liter.

5. The composition according to claim 1, wherein ii) the at least one α-hydroxycarboxylic acid is selected from the group consisting of: glycolic acid; lactic acid; 2-hydroxybutanoic acid; 2-hydroxypentanoic acid; 2-hydroxyhexanoic acid and mixtures thereof.

6. The composition according to claim 1, wherein carboxylic acid groups of the at least one α-hydroxycarboxylic acid are present in a molar ratio of said carboxylic acid groups to chromium (Cr) which does not exceed 1.5:1 and is at least 0.5:1.

7. The composition according to claim 1, wherein iv) the at least one compound having both a thiol group (—SH) and a carboxyl group (—$CO_2H$) is present in an amount of from 1 to 5 wt. %, based on weight of the composition.

8. The composition according to claim 1, wherein iv) the at least one compound having both a thiol group (—SH) and a carboxyl group (—$CO_2H$) is selected from the group consisting of: thiomalic acid, thioglycolic acid, thiocoumaric acid, cysteine; thiolactic acid and mixtures thereof.

9. The composition according to claim 1, wherein v) the at least one water-soluble or water-dispersible fluoroacid or a salt thereof comprises at least one water-soluble or water-dispersible fluoroacid defined by the General Formula (IIA):

$$H_pT_qF_rO_s \quad \text{(IIA)}$$

wherein: "T" is selected from Ti, Zr, or Si;
p is 1 or 2;
q is 1;
r is 2, 3, 4, 5 or 6; and
s is 0, 1, or 2.

10. The composition according to claim 1, wherein v) the at least one water-soluble or water dispersible fluoroacid or salt thereof comprises at least one water-soluble or water-dispersible fluoroacid selected from the group consisting of: fluorotitanic acid ($H_2TiF_6$); fluorozirconic acid ($H_2ZrF_6$); fluorosilicic acid ($H_2SiF_6$); fluoroboric acid ($HBF_4$); fluorostannic acid ($H_2SnF_6$); fluorogermanic acid ($H_2GeF_6$); fluorohafnic acid ($H_2HfF_6$); fluoroaluminic acid ($H_3AlF_6$) and mixtures thereof.

11. The composition according to claim 1, wherein v) the at least one water-soluble or water dispersible fluoroacid or salt thereof comprises at least one water-soluble or water-dispersible fluoroacid salt selected from the group consisting of: $(NH_4)_2ZrF_6$; $H(NH_4)ZrF_6$; $(NH_4)_2TiF_6$; $H(NH_4)_2TiF_6$; $Na_2ZrF_6$; $K_2ZrF_6$; $Li_2ZrF_6$; $Na_2TiF_6$; $K_2TiF_6$; $Li_2TiF_6$ and mixtures thereof.

12. The composition according to claim 1, wherein v) the at least one water-soluble or water-dispersible fluoroacid or a salt thereof is included in the composition in an amount such that a molar ratio of total mineral acid to the metal "T" of said fluoroacid is in a range from 10:1 to 1:1.

13. The composition according to claim 1, wherein carboxylic acid groups of the at least one α-hydroxycarboxylic acid according to component ii) have a molar ratio to chromium in a range from 1.1:1 to 2.5:1.

14. A process for imparting a chromate passivate film to a substrate having at least one surface coated with a zinc or zinc alloy coating, said process comprising contacting said at least one coated surface of the substrate with an aqueous composition as defined in claim 1 at a temperature ranging from 20° C. to 90° C. for a period of time sufficient to form a passivate film thereon.

* * * * *